United States Patent [19]

Iwami et al.

[11] Patent Number: 5,088,794
[45] Date of Patent: Feb. 18, 1992

[54] SEAT BELT DRAWING ANGLE ADJUSTMENT DEVICE

[75] Inventors: Mashahide Iwami; Shigeomi Murakami; Fumitaka Saito; Takao Watanabe; Masami Akiyama, all of Akishima, Japan

[73] Assignee: Tachi-S Co., Ltd., Tokyo, Japan

[21] Appl. No.: 611,907

[22] Filed: Nov. 9, 1990

[51] Int. Cl.⁵ .................... B60R 22/26; B60R 22/34
[52] U.S. Cl. ................................. 297/483; 297/475
[58] Field of Search ............... 297/475, 476, 483, 468; 242/107.4 R; 280/808

[56] References Cited

U.S. PATENT DOCUMENTS

| | | | |
|---|---|---|---|
| 4,065,072 | 12/1977 | Magyar | 297/476 X |
| 4,469,352 | 9/1984 | Körner et al. | 297/483 X |
| 4,542,939 | 9/1985 | Geoffrey | 297/475 X |
| 4,729,524 | 3/1988 | Befort et al. | 297/476 X |
| 4,940,254 | 7/1990 | Ueno | 297/483 X |

Primary Examiner—Kenneth J. Dorner
Assistant Examiner—J. Bonifanti
Attorney, Agent, or Firm—Oldham & Oldham Co.

[57] ABSTRACT

A seat belt drawing angle adjusting device provided on the upper end part of a seat back, comprising a housing, a seat belt retractor supported within the housing, a seat belt guide member rotatably supported in the housing and a lock mechanism for locking and unlocking the guide member. The guide member has, formed therein, a slit through which a seat belt passes from the retractor to the outside, and is so arranged as to be vertically movable, thereby allowing vertical displacement of the slit. Hence, the seat belt can be adjusted at lower or higher level in relation to its drawing point.

5 Claims, 2 Drawing Sheets

SEAT BELT DRAWING ANGLE ADJUSTMENT DEVICE

BACKGROUND OF THE INVENTION

1. Field of the Invention

The present invention relates to a device for adjusting an angle at which a seat belt is drawn out of a seat.

2. Description of Prior Art

A seat belt is provided, as a matter of course, within an automobile, with a view to properly restraining an occupant on the seat against a force which will tend to throw him or her away from the the seat in such a case as a collision or sudden deceleration.

Conventionally, the seat belt is to be drawn out of a given seat-belt drawing slit formed in the cabin wall or interior wall of the automobile, so that the occupant may draw the seat belt from such slit and attach it over his or her body for getting a sufficient restraint to the seat, which permits the occupant to do any action on the seat during driving the automobile, such as actuating a slide device for making a fore-and-aft positional adjustment of the seat or operating a reclining device to adjust an inclination angle of the seat back of the seat.

However, in the hitherto seat belt drawing arrangement, a sufficient restraint can not be attained in most cases from the seat belt being drawn out. This problem is attributed to the fact that the seat belt drawing angle varies depending on individual occupants having different physiques; namely, for a long-waisted occupant, the seat belt is to be drawn at a relatively greater angle relative to its drawing slit, but, for a short-waisted occupant, the drawing angle of the seat belt assumes less degree relative to the drawing slit. The hitherto arrangement, it this respect, disposes the seat belt drawing slit at a fixed point and thus results in creating such varied seat-belt-drawing angles, which does not provide a sufficient restrain of the seat belt to each of different occupants having different physiques. As a result, the occupant finds it difficult to draw the seat belt smoothly, or the seat belt may be bent acutely at its drawing slit and consequently damage.

To solve this problem, the Japanese Laid-Open Publication No. 2-42858 proposes a vertical slide means for adjusting the position of a seat belt according to the physical constitution of occupant on the seat. In this prior art, the seat belt is adjustably moved up and down by means of vertically sliding device having a seat belt guide through which the seat belt passes in a free way. However, the defective aspect of such prior art is that, when the sliding is lowered, the seat belt is forcibly acutely bent at the seat belt guide, as a result of which the seat belt is given a great friction, making it hard for an occupant to draw the seat belt for use.

SUMMARY OF THE INVENTION

With the foregoing drawbacks in view, it is therefore a purpose of the present invention to provide a seat belt drawing angle adjusting device which permits adjustment of an angle at which a scat belt is drawn from a seat back of a seat according to a physique of an occupant on the seat.

In order to achieve the purpose, a seat belt drawing angle adjusting device, in accordance with the present invention, comprises a housing in which a seat belt retractor is disposed, the housing being at its forward surface, with a hole which is opened great in its vertical direction in a way corresponding to the seat belt retractor; a seat belt guide means arranged in said housing such as to be movable vertically in a way to keep closing the hole of the housing, the seat belt guide means having, formed therein, a slit through which a seat belt passes from the seat belt retractor; and a lock means for locking and unlocking the seat bolt guide means so as to permit for setting the seat belt guide means at a desired point in vertical direction.

Accordingly, such vertical displaceability of the slit allows the seat belt to be adjusted via the guide member, without any undersired acute bending of the seat belt, so that the seat belt can be drawn out at a lower or higher level according to physique of the occupant on the seat.

DETAILED DESCRIPTION OF PREFERRED EMBODIMENT OF THE INVENTION

In FIGS. 1 through 5, designation (4) represents a seat belt angle adjusting device in accordance with the present invention.

Figure 1:
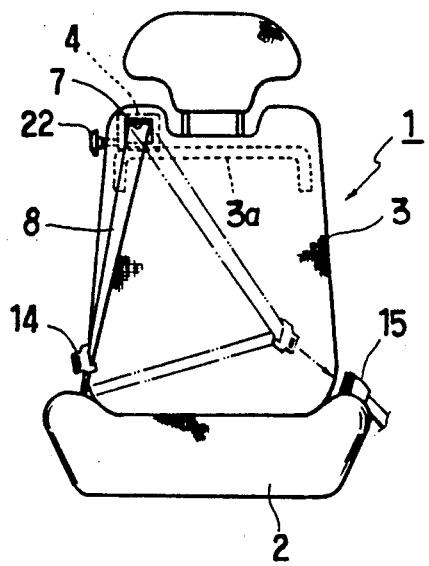
FIG. 1 is a front view of a seat to which a seat belt angle adjustment device in accordance with the present is applied.
Figure 2:
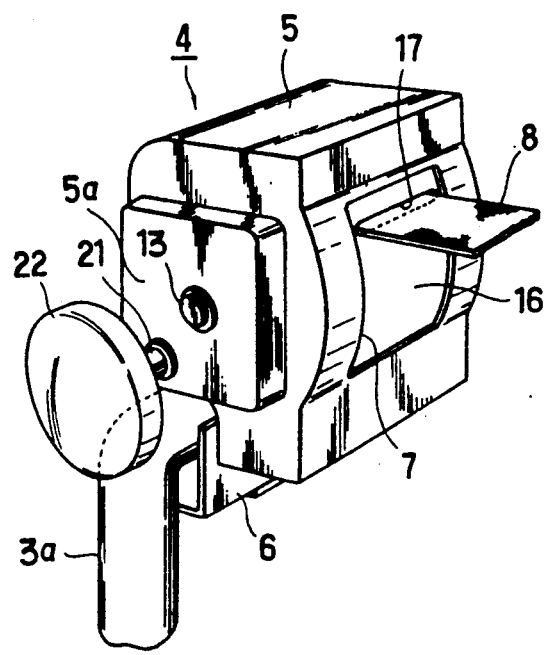
FIG. 2 is a perspective view of the seat belt angle adjustment device.

FIG. 1 shows the device (4) to be built in the left-side upper end area of a seat back (3) of an automotive seat (1). In this figure, numeral (2) denotes a seat cushion connected to the seat back (3), and a seat belt (8) is shown as being extended from the opened area (7) of the device (4) down to the left-side lower end area of the seat back (3), with a connecting tongue (14) attached to the lower portion of the seat belt (8). As indicated by the two-dot chain line, the connecting tongue (14) is to be connected with a buckle (15) disposed at the point adjacent to the right-side lower end area of of the seat back (3), so that the seat belt (8) may be attached over the body of an occupant on the seat (1). Designations (3a) and (22), respectively, denote a seat back frame and an operation handle of the device (4).

Reference is now made to FIGS. 2 through 5. The seat belt angle adjusting device (4) has a housing (5) which is at its lower end area welded fast on a base bracket (6) of an upper-opened channel cross section. In the base bracket (6), the seat back frame (3a) extends in the longitudinal direction of the bracket (6) and is securely attached thereto.

The housing (5) is formed at its frontal surface with the foregoing opened area (7) of generally square shape, and at the left-side lateral side thereof, provided with an auxiliary housing (5a).

Within those housing (5) and auxiliary one (5a), a seat belt retractor (9) of a known rotary drum type is provided, and upon the retractor (9), is wound the seat belt (8). Although not shown, the retractor (9) is so designed that its body is normally biased such as to be rotated in a direction to wind the seat belt (8) therearound, and that, when the seat belt (8) is suddenly drawn or pulled outwardly of the device (4), a lock means is actuated to prevent the seat belt (8) from being drawn out.

The seat belt retractor (9) is fixed to a support shaft (13) which extends transversely through the housing (5) and is at its both ends journalled by a cylindrical bearing member (12) for free rotation along its longitudinal axis, whereupon the support shaft (13) forms a rotation center of the retractor (9) and thus a center around which the seat belt is wound. In this connection, designation (11) stands for a pair of support brackets for supporting the retractor (9) in addition to the bearing member (12). The support brackets is firmly secured, at its lower base area, to the seat cushion frame (3a) by means of two securing members (10)(10) (e.g. bolt and nut). It should be understood, though not shown, that the shaft (13) passes through the support brackets (11), and therefore, the retractor (9) is rotatably supported by the housing (5) and the shaft (13).

Figure 3:
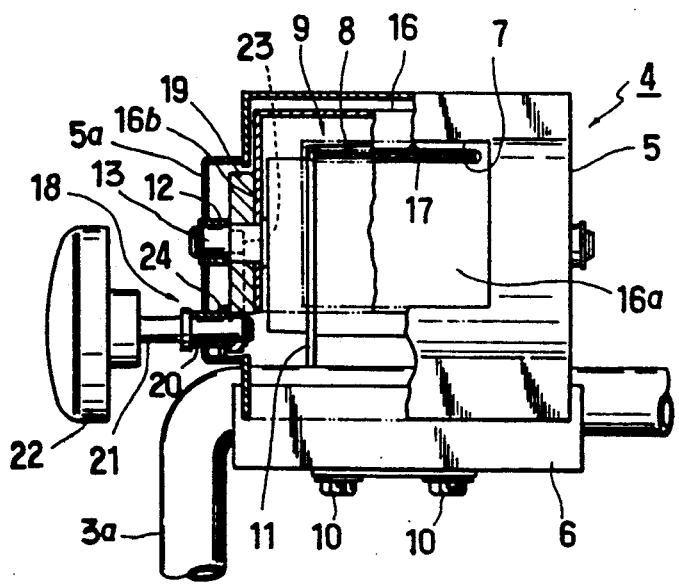
FIG. 3 is a partly broken front view of the same device.
Figure 4:
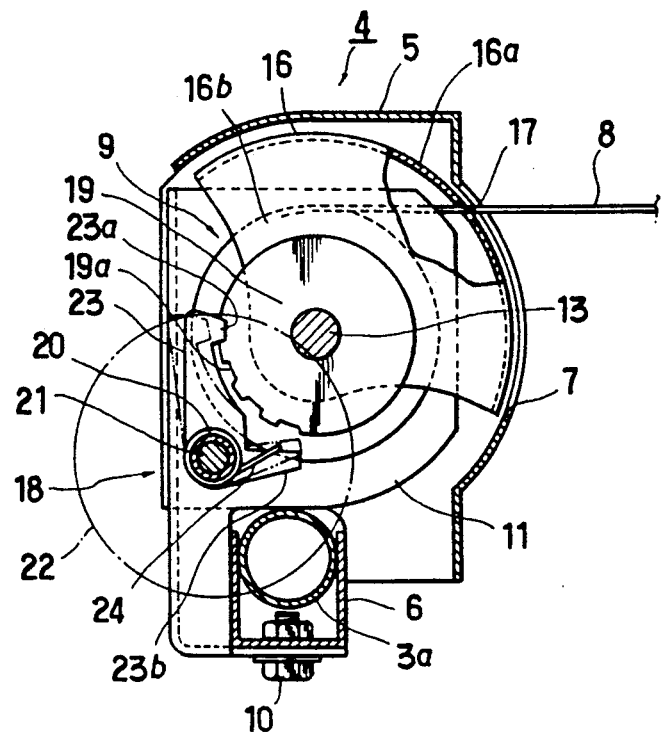
FIG. 4 is a sectional view of the device, showing the state that a seat belt is set at an angle of high level.
Figure 5:
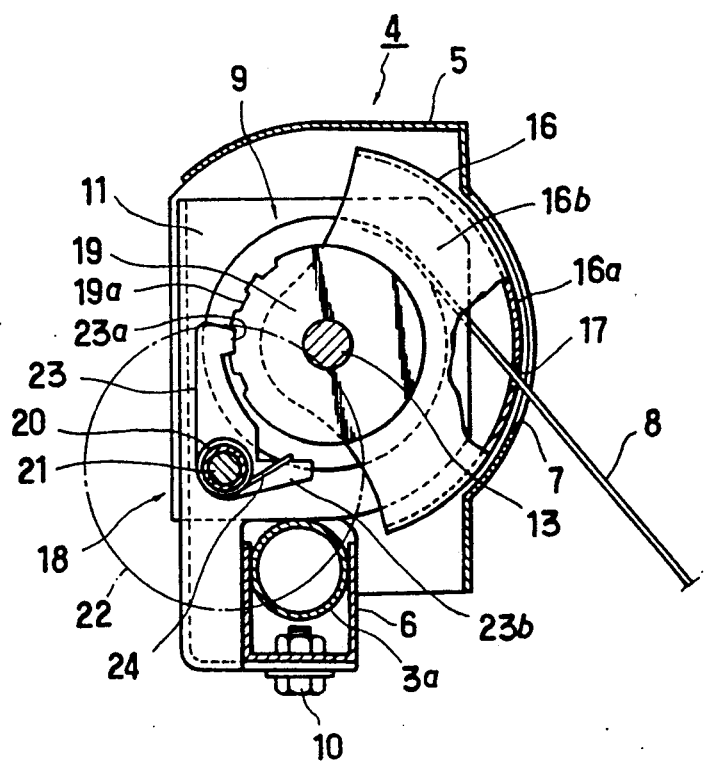
FIG. 5 is a sectional view of the device, showing the state that the seat belt is set at an angle of low level.

In the housing (5), there is provided a seat belt guide member (16) in a manner to substantially cover a half of the retractor (9) in a space-apart relation therewith. As best shown in FIGS. 3, 4 and 5, the guide member (16) is formed generally in a shape representing a half of a drum, comprising a generally semi-cylindrical or semi-circular central surface (16a) and a pair of flat lateral surfaces (16b) (not completely shown). The central surface (16a) is formed with a slit (17) at its central point, and the two lateral flat surfaces (16b), which extends continuously at a right angle from both lateral ends of the central surface (16a), are each at its center point formed with a hole through which the foregoing support shaft (13) passes, whereupon it is seen that the seat belt guide member (16) is supported by the support shaft (13) within the housing (5), and that the shaft (13) also forms a center of a circle along which the semi-circular central surface (16a) lies, defining a rotation center of the guide member (5) per se.

As understandable from FIGS. 4 and 5, the seat belt (8) passes through the slit (17) of the central surface (16a) of the seat belt guide member (16), and the central surface (16a) is to be rotatatively moved in upward and downward directions relative to the rotation center at (13), in such a way to keep closing the opened area (7) of the housing (5), whereby the interior of the housing (5) is not exposed to view, and the slit (17) is to be displaced vertically within the opened area (7) of the housing (5).

Consequently, with such vertical displacement of the slit (17), the seat belt (8), passing therethrough, is changeable in height in relation to its drawing point, as understandable from FIGS. 4 and 5, whereby as will be apparent later, it is possible to adjustably vary an angle at which the seat belt (8) is drawn out from the retractor (9) in a direction forwardly of the seat back (3).

Designation (18) generally indicates a lock mechanism for locking the seat belt guide member (16) against rotatative movement within the housing (5), so as to permit setting the slit (17) in a desired point in the range of opened area (7).

As shown, the lock mechanism (18) is arranged in the auxiliary housing (5a), comprising a lock disc (19) fixed upon the left-side lateral surface (16b) of the guide member (16), a lock arm (23) and the operation handle (22). Specifically, the lock disc (19) has, defined at its center, a hole through which the support shaft (13) passes, such as to be in a coaxial relation with the guide member (16), and further has, formed at its rearward peripheral side, a plurality of lock recesses (19a) (e.g. four lock recesses in the shown embodiment), in a manner opposing the central surface (16a) of the guide member (16). The lock arm (23) is fixed on an operation spindle (21) firmly connected to the handle (22), and includes at its upper end a lock pawl (23a) to be engaged into one of the plural lock recesses (19a) of the lock disc (19) and a lower lug portion (23b), such that the lock arm (23) is formed generally in a dogleg shape, with its lower lug portion (23b) extending at a right angle relative to the upper end section of the of the lock arm (23) where the lock pawl (23a) is defined. Upon the lower lug portion (23b), one free end of a torsion coil spring (24) is attached. The spring (24) is wound around the spindle (21), with its another base end being fixed to a suitable area in the inner wall of the auxiliary housing (5a). The spindle (21) is rotatably supported by a cylindrical support member (20) fixed on the auxiliary housing (5a). Accordingly, the lock arm (23) is normally biased by the spring (24) into engagement relation with the lock disc (19); namely, the lock pawl (23a) is normally kept in engagement with selected one of the plural lock recesses (19a) under the biasing force of the spring (24).

With the above-described structure, by rotating the operation handle (22) against the biasing force of the spring (24), the lock arm (23a) is rotated about the axis of the spindle (21) in a direction away from the lock disc (19), as indicated by the phantom line in FIG. 4, whereby the lock pawl (23a) is disengaged from the one of the lock recesses (19a). Then, at this moment, the seat belt guide member (16) is released from the locked state, thus being allowed to be freely rotated about the support shaft (13), which means to set free the vertical displacement of the slit (17) within the opened area (7) of the housing (15). Under such unlocked state, the seat belt (8) is caused by an occupant on the seat (1) to move upwardly or downwardly, so that the guide member (16) is rotated in likewise direction within the housing (5), thereby making adjustment for determining a desired point of the slit (17) in the opened area (7). Thereafter, the occupant has to release the handle (22), and the lock arm (23) is then returned by the biasing force of the spring (24) into engagement with another selected one of the lock recesses (19a), so that the guide member (16) is placed in a locked state, with the slit (17) being set a point determining angle at which to draw the seat belt (8) from the retractor (9), giving an optimal restraint to the occupant on the seat (1). This operational procedure varies an angle at which the seat belt (8) is drawn from the seat back (3) outwardly, thereby permitting the occupant to attain a desired angle at which to restrain him or her to the seat (1) according to the physique. For instance, for a long-waisted occupant, as shown in FIG. 4, the seat belt guide member (16) is rotated upwardly so as to set the slit (17) at a higher level within the opened area (7), so that the occupant may draw the seat belt (8) forwardly at a high level in an optimal state fitting to his or her long waist on seat (1). On the contrary, for a short-waisted occupant, as shown in FIG. 5, the seat belt guide member (16) is rotated downwardly so as to set the slide (17) at a lower level in the opened area (7), so that the occupant may draw the seat belt (8) at a lower level fitting to his or her short waist on the seat (1). In that way, a step-way adjustment can be effected, through an engagement of the lock arm (23) with selected one of the lock recesses (19a), in order to determine a desired seat-belt angle with respect to its drawing point, according to different physical constitutions of occupant on the seat.

Additionally, such vertical displaceability of the slit (17) prevents an acute bending of the seat belt (8) which is found in the prior art, which avoids damage of the seat belt.

While having described the present invention, it should be understood that the invention is not limited to the illustrated embodiment, but any other modifications, replacements and additions may structurally be possible without departing from the spirit and scope of the appended claims. For example, the lock mechanism (18), instead of the shown stepway adjustment, may be of a stepless adjustment type including a friction braking mechanism or other suitable means. The shown semi-drum type of seat belt guide member (16) may be altered into a vertically slidable type, so that the slit (17) is movable vertically on a straight plane, in contrast to the illustrated rotative vertical movement.

What is claimed is:

1. A seat belt drawing angle adjusting device which is provided in an upper end part of a seat back of a seat, comprising:
    a seat belt;
    a housing in which a seat belt retractor is disposed, said housing including a forward surface having therein an opened area which extends an appreciable distance in the vertical direction;
    a seat belt guide member which is arranged in said housing such as to be movable vertically in such a way as to keep closed said opened area of said housing, said seat belt guide member having formed therein a slit through which a seat belt passes from said seat belt retractor; and
    a lock means for locking and unlocking said seat belt guide member so as to permit for setting said seat belt guide means at a desired point in vertical direction.

2. The seat belt drawing adjusting device as in claim 1, wherein said housing is welded to a base bracket fixed to a seat cushion frame in a seat cushion, wherein, within said housing, a pair of support brackets are fixed on said base bracket, wherein a support shaft is extended within said housing, wherein said seat belt retractor is supported on said support shaft, and wherein said seat belt guide member is supported on said support shaft in a rotatable manner.

3. The seat belt drawing angle adjusting device as in claim 1, wherein said seat belt guide member is generally semi-cylindrical and includes a semi-circular central surface and a pair of flat lateral surfaces extending continuously from both lateral sides of said central surface at a right angel relative thereto, and wherein said central surface of said seat belt guide member is formed with said slit.

4. The seat belt drawing angle adjusting device as in claim 2, wherein said seat belt guide member is generally semi-cylindrical and includes a semi-circular central surface and a pair of flat lateral surfaces extending continuously from both lateral sides of said central surface at a right angle relative thereto, and wherein said central surface of said seat belt guide member is formed with said slit through which said seat belt passes.

5. The seat belt drawing angle adjusting device as in claim 1, wherein said lock means comprises a lock disc having, formed at its periphery, plural lock recesses, said lock disc being fixed to said seat belt guide means, an operation spindle which is rotatably supported at a lateral side of said housing, a lock arm fixed on one end of said operation spindle located in such a manner that said lock arm is engageable with one of said plural lock recesses of said lock disc, an operation handle fixed on the other end of said operation spindle, where it is located exteriorly of said housing, and a spring means for biasing said lock arm into engagement with one said lock recesses.

* * * * *